United States Patent [19]

Bordy et al.

[11] Patent Number: 5,235,624
[45] Date of Patent: Aug. 10, 1993

[54] METHOD AND DEVICE FOR DETECTING A LEAK FROM A FUEL ELEMENT OF AN ASSEMBLY FOR A NUCLEAR REACTOR

[75] Inventors: Michel Bordy, Lyons; Bernard Gebelin, Tassin-la-Demi-Lune, both of France

[73] Assignees: Framatome, Courbevoie; Cogema, Villacoublay, both of France

[21] Appl. No.: 758,683

[22] Filed: Sep. 12, 1991

[30] Foreign Application Priority Data

Sep. 13, 1990 [FR] France ................. 90 11332

[51] Int. Cl.⁵ ............................................ G21C 17/07
[52] U.S. Cl. ................................. 376/253; 376/251; 376/250; 376/245
[58] Field of Search ................. 376/250, 251, 253, 245

[56] References Cited

U.S. PATENT DOCUMENTS

| | | |
|---|---|---|
| 3,073,767 | 1/1963 | Whitham et al. ............... 204/154.2 |
| 3,419,467 | 12/1968 | Holzer et al. ..................... 176/19 |
| 3,762,993 | 10/1973 | Jones ................................ 176/19 R |
| 4,034,599 | 7/1977 | Osborne ............................. 73/40.7 |
| 4,072,559 | 2/1978 | Neidl et al. ..................... 176/19 LD |
| 4,082,607 | 4/1978 | Divona ............................. 176/19 D |
| 4,225,388 | 9/1980 | Bellaiche et al. ............ 176 L/19 D |
| 4,382,906 | 5/1983 | Ambros et al. .................. 376/247 |
| 4,416,847 | 11/1983 | Saito et al. ...................... 376/253 |
| 4,696,788 | 9/1987 | Seli .................................. 376/253 |
| 5,028,380 | 7/1991 | Pelletier et al. ................. 376/250 |

FOREIGN PATENT DOCUMENTS

| | | |
|---|---|---|
| 0138711 | 6/1985 | European Pat. Off. . |
| 2315148 | 1/1977 | France . |
| 2389202 | 11/1978 | France . |
| 2569041 | 2/1986 | France . |

*Primary Examiner*—Donald P. Walsh
*Assistant Examiner*—Chrisman D. Carroll

[57] ABSTRACT

The fuel element is inserted into a cell, under water, in a pool. Compressed air is injected into the cell so as to drain it of water. A pressure lower than atmospheric pressure is established in the cell and then the gases contained in the cell are subjected to a stream of scavenging air and are collected in a fission product detecting unit. Water is introduced into the cell, the water in the cell is sampled, fission products in the water sample are detected and the fuel element is extracted from the cell if the possible presence of a leak from this fuel element is determined. The detection device comprises a cell having an elongate body delimiting a central housing for a fuel element and end parts. One of the end parts, traversed by a channel in the extension of the housing, receives a cap for opening and closing the channel associated with a remotely controllable opening and closing arrangement. The device also comprises a fluid circuit enabling the cell to be supplied with pressurized water and compressed air.

9 Claims, 5 Drawing Sheets

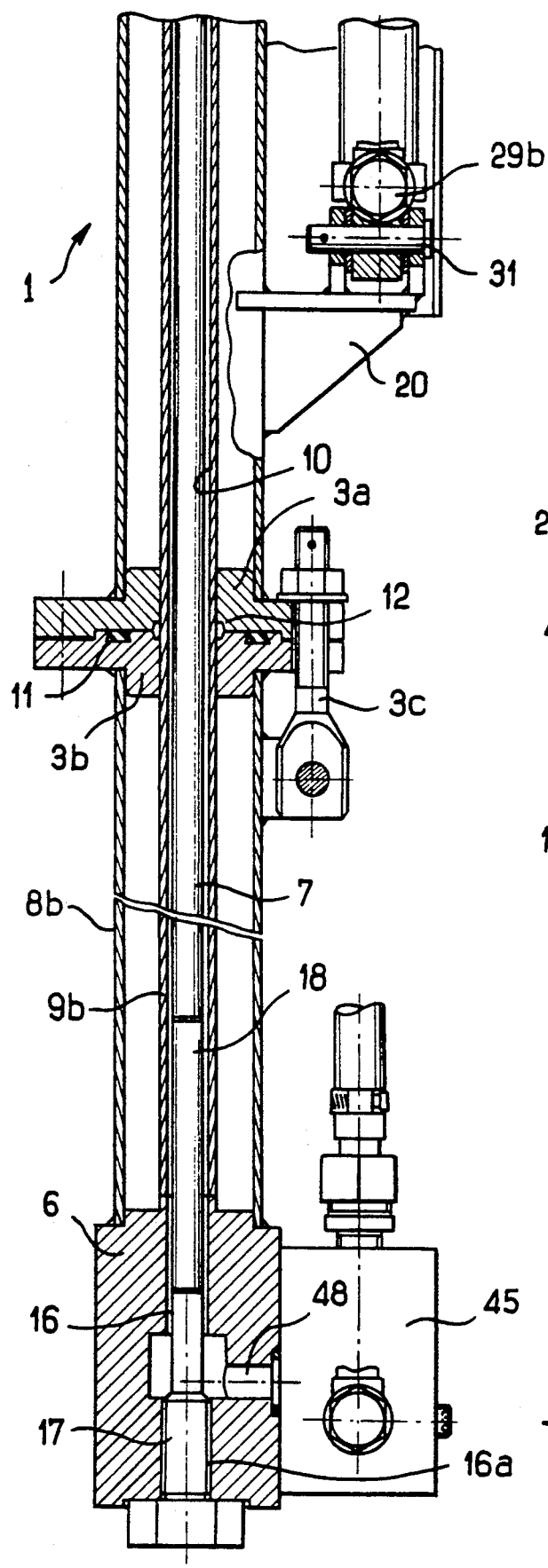
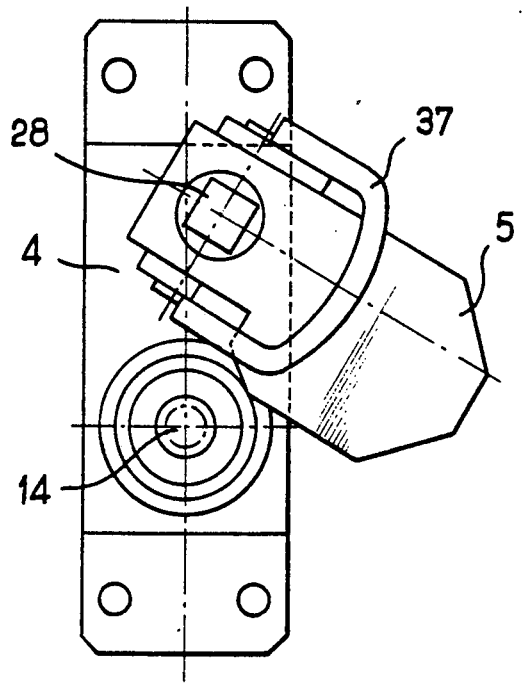
FIG. 3
FIG. 2B

METHOD AND DEVICE FOR DETECTING A LEAK FROM A FUEL ELEMENT OF AN ASSEMBLY FOR A NUCLEAR REACTOR

FIELD OF THE INVENTION

The invention relates to a method and to a device for detecting leaks from a fuel element of an assembly for a nuclear reactor.

BACKGROUND OF THE INVENTION

Water-cooled nuclear reactors, such as pressurized water nuclear reactors, comprise fuel assemblies which are placed in a juxtaposed disposition inside the reactor vessel, in order to form the core which is the center of nuclear reactions producing the energy which is transmitted to the coolant of the reactor in the form of heat.

The fuel assemblies are formed by bundles of lengthy fuel elements or rods of small diameter. The fuel rods themselves are formed by a metal cladding in which pellets of fuel material such as uranium oxide are stacked, and which is closed in a sealed manner at its ends by plugs.

The cladding of the fuel elements is constructed from an alloy resistant to high temperature corrosion by the water cooling the reactor and of low neutron absorption. The cladding of the fuel element makes it possible to isolate the pellets made of fuel material from the cooling water and to prevent fission products formed by nuclear reaction in the fuel material from being entrained by the water cooling the reactor.

After being present in the operating reactor for some period of time, certain assemblies of the core may exhibit sealing faults which are manifested by a release of radioactive fission products into the coolant. The level of radioactivity of the cooling water makes it possible to determine the presence of assemblies exhibiting leaks in the reactor core. These assemblies must be detected in order that their repair or their replacement can be effected, during a shutdown phase for maintenance of the reactor, so as to prevent contamination of the primary cooling system in which the cooling water flows.

The detection of the defective fuel assemblies may be effected under water in the pool, by acoustic, ultrasonic or eddy current methods of measurement.

It is also possible to use cells called sipping test containers in which the release of radioactive products by the fuel assembly is promoted, these radioactive products being subsequently carried away by the water or a gas into a unit enabling them to be detected.

In the case where such radioactive products have been detected, it is necessary to effect the replacement or the repair of the fuel assembly before reloading it into the reactor core. Leaks of radioactive product originating from an assembly arise from a sealing fault in at least one rod of the assembly whose cladding is cracked.

Certain methods for monitoring the fuel assemblies make it possible to locate the defective rod(s) but these methods are generally complex and do not make it possible to determine completely reliably the location of the defective rods.

Refurbishing defective assemblies, effected by replacing the rods which are likely to leak by new rods, is therefore not always effected under satisfactory conditions.

Furthermore, in the case of studies carried out in order to research the causes of the presence of faults in fuel elements, until now use has been made of eddy current test methods or macroscopic visual test methods carried out individually on each of the rods of the fuel assemblies subjected to the tests.

Until now no method and device making it possible to determine extremely reliably the presence of leaks from a fuel element of an assembly for a nuclear reactor, such as a fuel rod, has been known.

SUMMARY OF THE INVENTION

The object of the invention therefore is to propose a method for detecting leaks from a fuel element of an assembly for a nuclear reactor which is extremely reliable, relatively simple and rapid to implement, and which may be carried out on individual fuel elements of variable length.

For this purpose:
- the fuel element is inserted into a cell, under water, in a pool,
- compressed air is injected into the cell in such a manner as to drain it of the water which it contains,
- a pressure lower than atmospheric pressure is established in the cell, in such a manner as to promote the escape of fission products originating from the fuel element in the event of a leak,
- scavenging of the gases contained in the cell is performed by a stream of scavenging air, and these gases are collected in a fission product detecting unit,
- water is introduced into the cell,
- a sampling is carried out of water in the cell,
- a detection of fission products in the water sample is carried out, and
- the fuel element is extracted from the cell, after the possible presence of a leak from this fuel element has been determined by detection of fission products.

The invention also relates to a device enabling the method according to the invention to be employed.

BRIEF DESCRIPTION OF THE DRAWINGS

For better understanding of the invention, there will now be described, by way of example and by reference to the attached drawings, a device for detecting a leak from fuel rods of an assembly for a pressurized water nuclear reactor and its use for employing the method according to the invention.

FIGS. 2A and 2B are sectional views through a vertical plane of the upper portion and of the lower portion, respectively, of the cell shown in FIGS. 1A and 1B.

FIG. 3 is a plan view in the direction of arrow 3 of FIG. 2A.

DESCRIPTION OF PREFERRED EMBODIMENTS

Figure 1A:
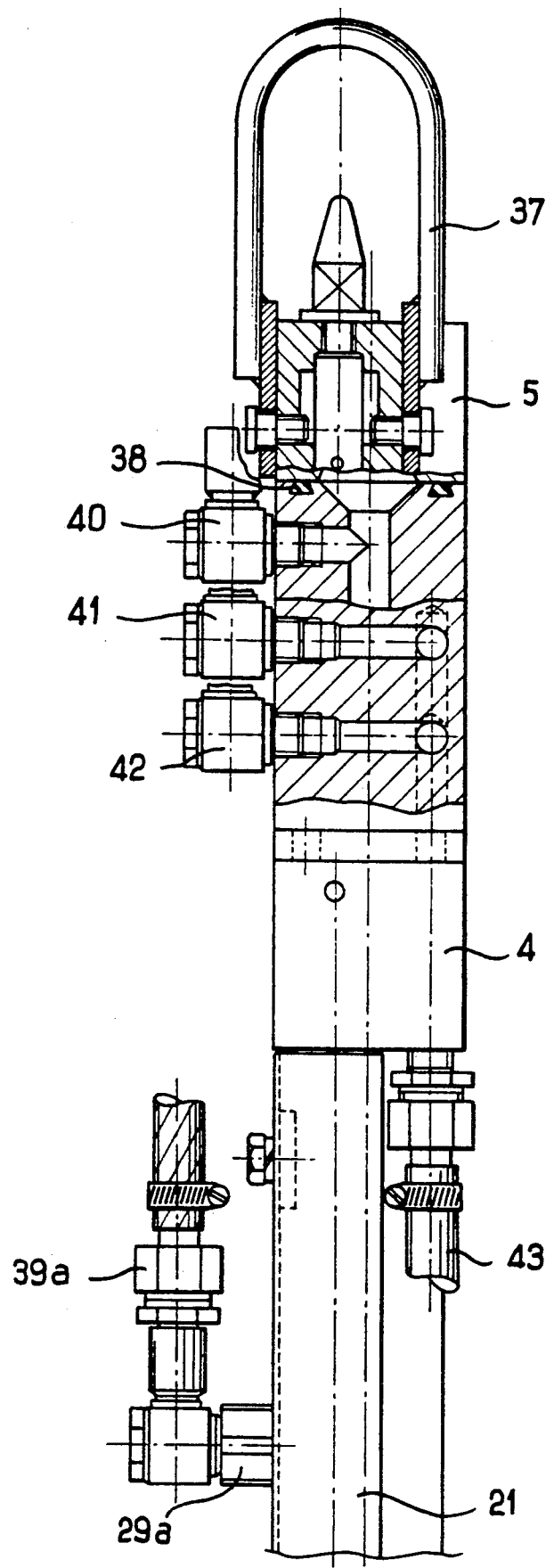
FIGS. 1A and 1B are front views of the upper portion and of the lower portion, respectively, of a cell enabling a leak from a fuel rod to be detected.
Figure 1B:
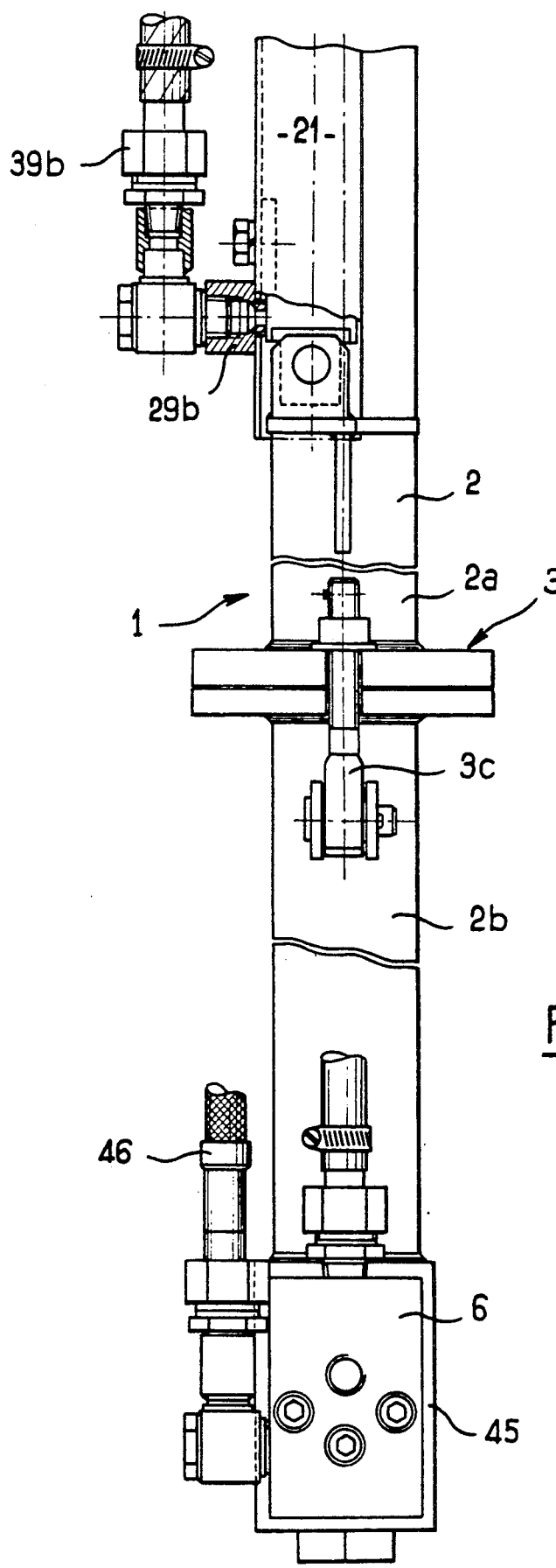

FIGS. 1A, 1B, 2A and 2B, show a leak detection cell or sipping test container 1 for an individual fuel rod.

The cell 1 comprises a dual-casing elongate tubular body 2 formed by an upper section 2a and a lower section 2b connected by a connecting device 3.

The upper section 2a is fixed at its upper end to a head 4 on which rests a cap 5 for closing the cell 1.

The lower portion of lower section 2b is integral with a foot portion 6.

The upper section 2a comprises a tubular external casing 8a and an internal casing 9a likewise tubular and coaxial with the casing 8a.

Likewise, the lower section 2b comprises an external tubular casing 8b and an internal casing 9b coaxial with the external casing 8b.

The connecting device 3 comprises an upper flange 3a integral with the section 2a, a lower flange 3b integral with the section 2b and three bolts such as 3c mounted pivotally about a horizontal axis, on support feet fixed at 120° to each other around the lower section 2b.

The flanges 3a and 3b comprise peripheral cutouts in which the bolts 3c may be engaged. The flanges 3a and 3b are assembled and clamped by the nuts engaged onto the bolts 3c. The flanges 3a and 3b comprise a projecting cylindrical central portion whose diameter is substantially equal to the internal diameter of the casings 8a and 8b which are engaged onto the central portion of the flange 3a and onto the central portion of the flange 3b, respectively. The external casings 8a and 8b are fixed by welding onto the flanges 3a and 3b respectively, on the periphery of their central portion.

In addition, the flanges 3a and 3b comprise a central bore whose diameter is substantially equal to the diameter of the internal casings 9a and 9b.

The end portions of the casings 9a and 9b are engaged into the bores of the flanges 3a and 3b, respectively.

When sections 2a and 2b are in their assembled position, as shown in FIG. 2, the internal casings 9a and 9b of the sections 2a and 2b, respectively, are in the extension of the one with the other and form a continuous internal casing delimiting a housing 10 for a fuel element 7 inside the cell 1.

An external gasket 11 and an internal gasket 12 are sandwiched between the flanges 3a and 3b and placed in coaxial positions.

The internal seal 12 provides the sealed closing of the housing 10, at the end junction of the casings 9a and 9b.

The dual casing 8a, 8b; 9a, 9b makes it possible to produce thermal insulation of the housing 10 and contributes to the mechanical strength of the cell 1.

The head 4 of the cell is traversed, in the axial extension of the casing 9a, by a channel 14 emerging in an opening 15 of the cap 5 at its upper end.

The channel 14 and the opening 15 form the upper portion of the housing 10 of the cell 1 intended to receive a fuel rod 7.

The foot portion 6 of the cell is traversed by an opening 16, in the axial extension of the casing 9b.

The opening 16 comprises a tapped portion 16a in which a bolt 17 for closing the lower portion of the housing 10 is engaged. An adjustment rod 18 whose diameter is slightly less than the internal diameter of the housing 10 has a lower portion which bears, on the internal end of the bolt 17. The bolt 17 provides the sealed closing of the housing 10 at its lower portion.

A cell such as the cell 1 is designed in order to permit the detection of a leak from fuel rods of different types having various lengths between a minimum value and a maximum value.

Figure 2A:
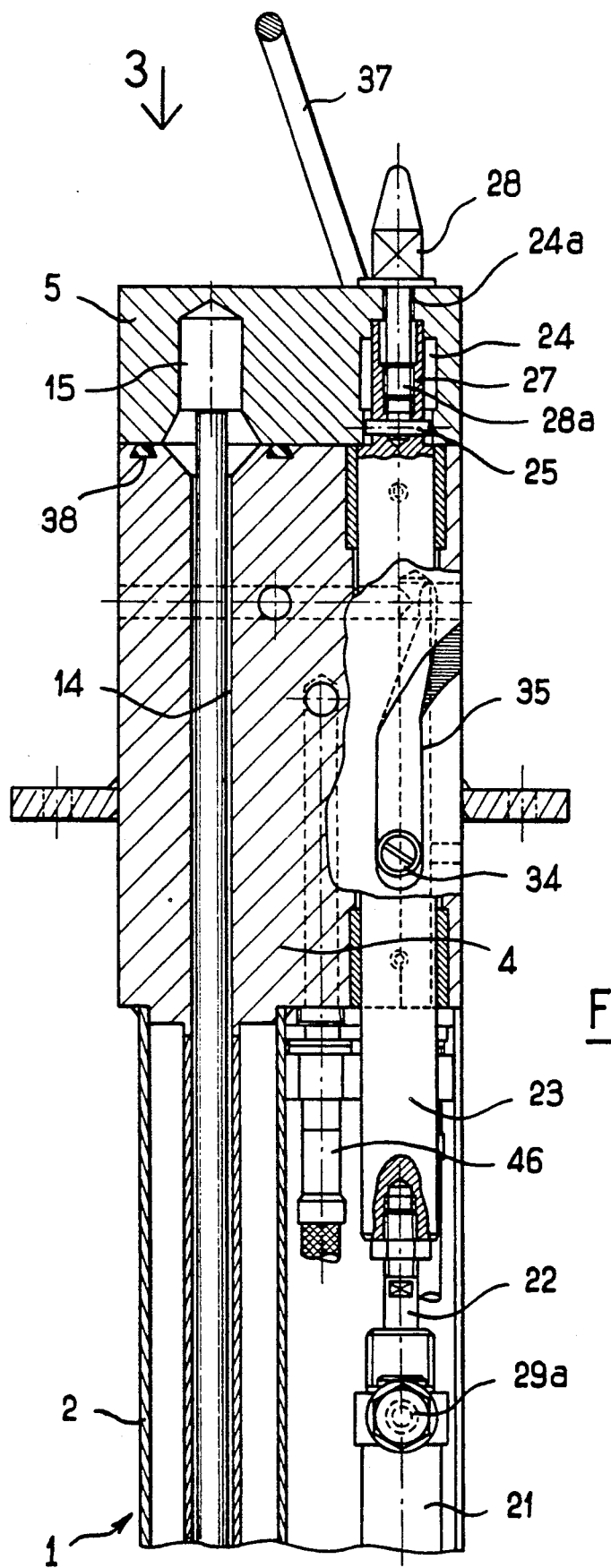

In their configuration shown in FIGS. 2A and 2B, the cell 1 and the housing 10 have a minimum length making it possible to perform within the cell a detection on a fuel rod of the type having the shortest length.

The detection of a leak from fuel rods of different types having greater lengths may be carried out within the cell by sandwiching additional sections, substantially similar to the upper section 2a and to the lower section 2b, between these two sections.

Successive sections of the body 2 of the cell may be assembled by using connecting devices with flanges and pivoting bolts such as the device 3.

In addition, the fuel rods of the same type may have certain dimensional variations and in particular certain differences in length, for example under the effect of the expansions undergone in the reactor environment.

Insofar as the upper portion of the fuel rod 7 inserted into the housing 10 should be accurately located, use will be made of adjustment rods similar to the rod 18 in order to compensate for the variations in length of the various fuel rods inserted into the housing 10.

The rods 18 are inserted through the end of the opening 16 of the foot 6 of the cell and these rods are clamped by the bolt 17 for closing the lower portion of the housing 10.

The position of the fuel rod inside the housing 10 is generally adjusted in such a manner that the upper portion of the rod projects over a length of approximately 10 mm in relation to the upper surface of the head 4 of the cell on which the cap 5 rests.

The external upper casing 8a of the body 2 carries a support foot 20 on which is fixed a pneumatic actuator 21 for opening and closing the cap 5. The rod 22 of the actuator 21 is integral with a drive shaft 23 mounted for sliding axial movement inside the head 4 of the cell, by use of sliding bearings.

The drive shaft 23 comprises an upper end of reduced diameter engaging in the cap 5, inside an opening 24.

The upper end of the drive shaft 23 comprises a diametral opening in which a pin 25 is engaged.

The ends of the pin 25 traversing the upper portion of the shaft 23 are engaged in grooves machined in the cap 5.

The opening 24 traversing the cap 5 emerges via a tapped end portion 24a at the upper surface of the cap. The upper portion of the drive shaft 23 is tubular and has over its internal surface a tapped portion 27 whose diameter and pitch are identical to the diameter and pitch of the tapped portion 24a of the opening 24.

Above the tapped portion 27 the inner bore of the end of the shaft 23 is diametrally enlarged.

A bolt 28 comprising a threaded portion 28a may be engaged in the tapped opening 24a and then in the tapped opening 27 of the end of the shaft 23, in order to provide a connection between the cap 5 and the shaft 23.

The cap 5 connected at the end of the shaft 23 by the bolt 28 may be actuated by the pneumatic actuator 21 in the direction of the opening or of the closing of the cap 5. The double-action pneumatic actuator 21 is supplied by means of pipes connected to two connections 29a and 29b integral with the body of the actuator 21.

The body of the actuator 21 is fixed in an articulated manner by means of a horizontal spindle 31 on the support foot 20.

The drive shaft 23 carries a roller 34 rotatably mounted on a spindle transversly of the shaft 23. The roller 34 is engaged inside a groove 35 machined in the head 4 of the cell 1.

The groove 35 comprises a rectilinear lower portion and a helically shaped upper portion having as axis the displacement axis of the shaft 23 integral with the rod 22 of the actuator.

In order to open the cap 5, from its closed position shown in FIGS. 1 and 2, the pneumatic actuator 21 is actuated in the direction causing the upward displacement of the rod 22.

The drive shaft 23 integral with the rod 22 of the actuator is also displaced upwards and effects lifting of the cap above the upper surface of the head 4, the cap 5 being integral with the drive shaft 23 by virtue of the bolt 28.

When the roller 34 reaches the upper portion of the helically shaped groove 35, the co-operation of the roller 34 with the groove 35 causes the drive shaft 23 and the cap 5 to rotate about the axis of vertical displacement of the shaft 23.

The cap 5 is placed, by pivoting about the axis of the rod 23, into the open position of the upper end of the housing 10 shown in FIG. 3.

The closing of the cap 5 is provided by downward displacement of the rod 22 of the actuator and of the drive shaft 23, the cap first carrying out a rotation replacing it vertically above the opening of the housing 10 and subsequently a vertical displacement, these displacements being obtained by displacement of the roller 34 in contact respectively with the helical portion and with the reactilinear portion of the groove 35.

In the event of a failure of the actuator 21, the opening or the closing of the cap 5 may be performed manually.

Remote unbolting of the bolt 28 is performed by virtue of a pole at the end of which is placed a tool coming into engagement with the bolt head, the cell 1 being placed beneath a certain depth of water.

The unbolting of the bolt 28 makes it possible to disconnect the cap 5 from the drive shaft 23. The cap 5 may be placed in the open position by virtue of a traction tool which is put into engagement with the handling lug 37 integral with the cap.

The cap of the cell 1 which is used at a water depth of the order of 10 meters, may therefore be remotely actuated in all cases, either automatically by using the pneumatic actuator 21 or, in the event of failure of the actuator, manually.

After opening the cap 5, a fuel element such as a rod 7 extracted from a defective assembly may be inserted inside the housing 10 of the cell 1, by way of an upwardly flared opening of the channel 14 of the head 4 of the cell.

The position in the vertical direction of the rod 7 may be adjusted, as indicated hereinabove, by choosing an adjustment rod 18 of desired length.

The housing 10 of the cell is filled with water from the pool into which the fuel element is immersed. The cap 5 is put back into the closed position.

An O-ring 38 makes it possible to provide a sealed closing of the cap 5 which rests on the upper portion of the head 4 of the cell with a certain pressure which may be exerted by virtue of the actuator 21, by means of the drive shaft 23 and the bolt 28.

The actuator 21 is supplied with compressed air by means of pipes 39a and 39b connected respectively to the nozzles 29a and 29b.

The head 4 of the cell is pierced with channels for distributing fluid, to which are connected nozzles 40, 41 and 42 permitting the connection of fluid inlet pipes.

The nozzle 40 communicates with a channel emerging in the upper portion of the channel 14, i.e., at the upper portion of the housing 10 of the cell.

The nozzle 41 communicates with a channel connected by means of a pipe 43 to a three-way valve 45 fixed on the foot 6 of the cell.

The nozzle 42 communicates with a channel connected by means of a flexible pipe 46 to one of the ways of the three-way valve 45.

Figure 4:
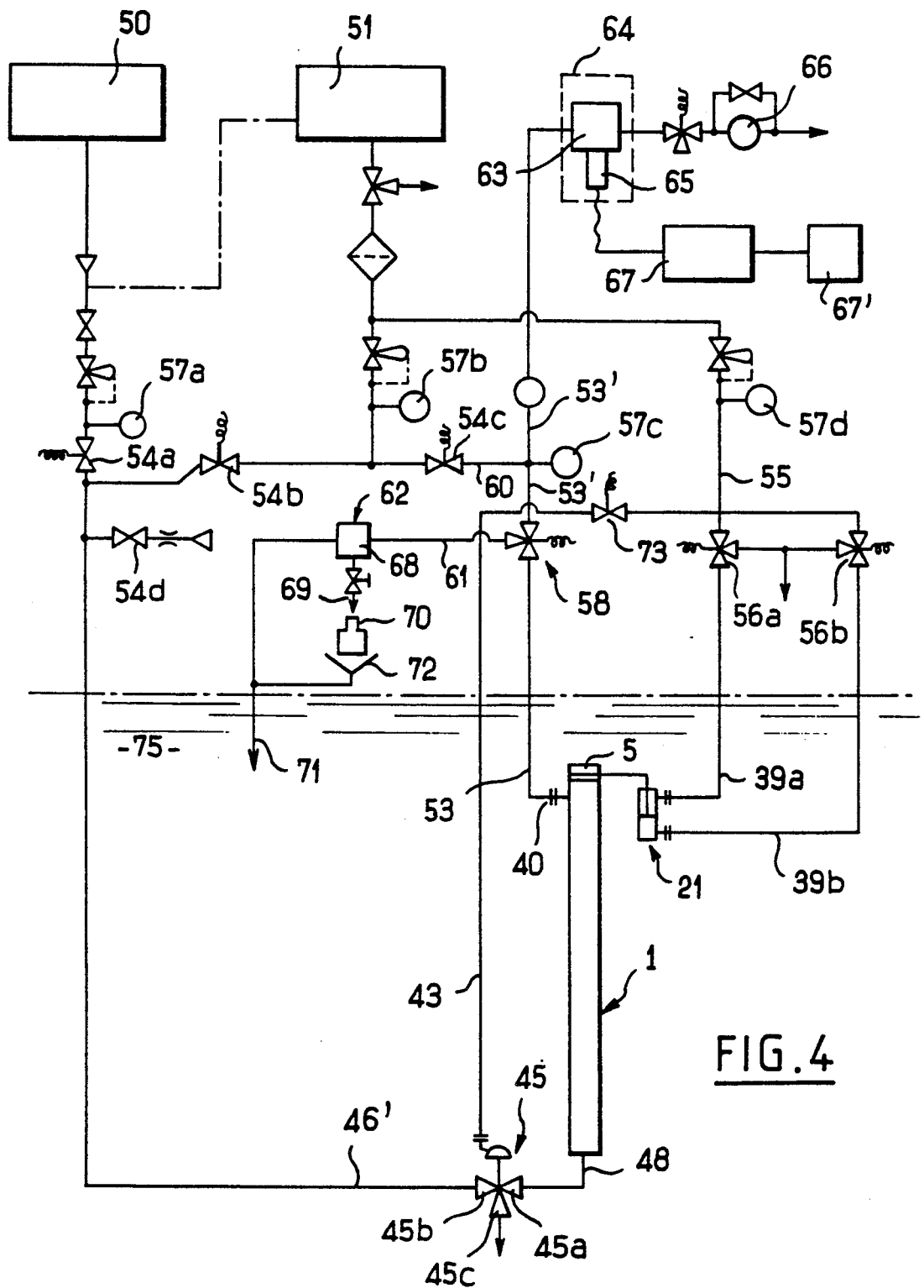
FIG. 4 is a schematic view of a circuit for supply and control of a detection cell such as shown in FIGS. 1A, 1B, 2A and 2B.

The nozzles 40, 41 and 42 make it possible to connect the cell to the supply pipes of a fluid circuit which is shown in FIG. 4 and which will be described hereinbelow.

The nozzles 40 and 42 are connected to pipes of the fluid circuit in which demineralized water or compressed air may flow.

The nozzle 40 enables the upper portion of the housing 10 of the cell to communicate with the fluid circuit while the nozzle 42 enables the lower portion of the housing 10 to communicate with the fluid circuit, by means of the three-way valve 45.

The nozzle 41 which is connected to a compressed-air pipe of the fluid circuit makes it possible to control the three-way valve 45.

The three-way valve 45 comprises a first way communicating with the pipe 46, a second way communicating with a channel 48 emerging at the lower portion of the housing 10 (FIG. 2B) and a third way (not shown) emerging inside the pool.

FIG. 4 will now be referred to, in order to describe the fluid circuit connected to the cell 1 and permitting the various successive phases of the detection method according to the invention to be carried out.

The cell 1 has been shown, in which the cap 5 may be actuated for opening or its closing by means of the double-action pneumatic actuator 21 whose chambers are supplied with compressed air by means of the pipes 39a and 39b.

The housing 10 of the cell, as described hereinabove, is connected at its lower portion to the fluid circuit, via the channel 48, the three-way valve 45 and a pipe 46' comprising an end portion formed by the pipe 46 shown in FIGS. 1 and 2.

The fluid circuit comprises a source 50 of pressurized demineralized water and a compressed-air source 51 which are both connected, via connecting pipes, to the pipe 46' connected to the three-way valve 45 at the lower portion of the cell 1 and to a pipe 53 connected at the upper portion of the cell via the nozzle 40.

Solenoid valves such as 54a, 54b and 54c enable the pipes 46' and 53 to be connected with the source of demineralized water or with the source of compressed air whose pressure is of the order of 10 bars.

The compressed-air source 51 is also connected to the pipes 39a and 39b for supplying the pneumatic actuator 21, via a pipe 55 and three-way valves 56a and 56b.

The control of the three-way valves 56a and 56b enables one of the chambers of the actuator to be supplied with compressed air and the other chamber to be at atmospheric pressure, in order to control the displacement of the actuator in either direction, i.e., in the direction of opening or closing cap 5.

Pressure gauges such as 57a, 57b, 57c and 57d make it possible to measure the pressure of the demineralized water or the compressed air coming from the sources 50 and 51.

A three-way valve 58 is interposed on the pipe 53 connected at the upper portion of the housing of the chamber 1, between the nozzle 40 and the connection point of the pipe 53 with the demineralized water or compressed air inlet pipe 60 in which the solenoid valve 54c is placed.

One of the ways of the valve 58 is connected to the nozzle 40 by means of the pipe 53, a second way is connected to the pipe 60 by means of a pipe 53', and the third way is connected by means of a pipe 61 to a water sampling device 62.

The pipe 53' is extended beyond its branching with the pipe 60 in such a manner as to be connected to radioactive counter device 63 comprising a γ or β detector disposed inside a lead shield 64.

The counter device 63 is itself connected, via a three-way valve, to a pumping circuit comprising a vacuum pump 66.

The counting device 63 comprises a counting unit 65 formed by the γ or β detector and connected to an electronic module 67 enabling the results supplied by the counting unit 65 to be used, and to be displayed, in terms of output, on a recorder 67'.

The sampling device 62 comprises a receptacle 68 having a capacity of approximately 1 liter, a sampling valve 69 and a flask 70 of 100 cm$^3$ capacity.

The sampling device 62 comprises an outlet pipe connected to a removal pipe 71 enabling the water sampled by the receptacle 68 to be returned into the pool 75 within which the cell 1 is immersed.

A draining device 72 connected to the pipe 71 is also placed beneath the sampling flask 70.

The three-way valve 45 fixed at the lower portion of the cell comprises a first way 45a connected via the channel 48 to the lower portion of the housing 10 of the cell, a second way 45b connected to the pipe 46' of the fluid circuit and a third way 45c connected to a pipe for removal of water emerging in the pool.

The compressed-air inlet pipe 55 of the actuator 21 is also connected to the pipe 43, with interposition of a solenoid valve 73. The three-way valve 45 may thus be controlled by opening or closing the solenoid valve 73.

As indicated hereinabove, in order to carry out a detection on a fuel rod 7, the rod 7 is inserted into the housing 10 of the cell whose cap is left open.

First, the water contained in the pipes 46 and 46' is forced back, by means of compressed air, into the pool through the cell 1. To this end, the valve 54b is opened and the ways 45b and 45a of the valve 45 are put into communication.

The cap 5 of the cell 1 is then closed in a sealed manner.

Compressed air coming from the source 51 is injected into the upper portion of the housing 10 of the cell 1 via the pipes 60 and 53, the valve 54c being opened and the three-way valve 58 being placed into a position bringing the pipes 53' and 53 into communication.

The three-way valve 45 is controlled in such a way that its ways 45a and 45c are brought into communication, in order to bring the channel 48 emerging at the lower portion of the housing 10 into communication with the pipe for removal of water, inside the pool 75.

The compressed air penetrating into the upper portion of housing 10 enables the water contained in the housing 10 to be removed, inside the pool 75, via the channel 48 and the three-way valve 45.

The three-way valve 45 is then placed in a position providing the connection between the ways 45b and 45a. Thus the entire circuit in which the solenoid valves 54b and 54c are disposed is filled with air.

The closing of the solenoid valve 54c is controlled and the vacuum pump 66 is put into operation, in such a manner as to remove the air contained in the housing 10 of the cell 1 and to establish a pressure substantially less than atmospheric pressure in the housing.

The outer surface of the fuel rod contained in the housing 10 is then subjected, to a reduced pressure, so that, in case the fuel rod has one or more leak-generating cracks, fission gases are sucked into the housing 10.

The opening of the solenoid valve 54d is then controlled.

Air is then introduced into the housing 10 of the cell 1 by its lower portion and scavenges the housing 10, causing entrainment of the fission gases previously released.

The fission gases are entrained by the scavenging air into the counting device 63 whose volume is substantially greater than the volume of the housing 10.

All or a substantial portion of the fission gases possibly released by the fuel rod are thus collected into the counting device 63.

Radioactive counting carried out by the unit 65 in the device 63 makes it possible to display the results of the counting carried out, after processing by the electronic module 66, on the recorder 67.

The presence of fission gases is then detected by comparing these results with the results of counting carried out on a sound rod, and from this it may be deduced that the fuel rod being examined is defective.

If fission gases are not detected in significant quantity, it may be deduced that the rod being monitored does not exhibit a leak prohibiting its re-use.

The recorder 67' may be so designed as to display clearly the diagnostic (defective or not defective) pertinent to the fuel rod.

However, in all cases, the diagnostic carried out by counting on the scavenging gases from the housing 10, after the latter has been placed under reduced pressure, is checked by a second detection operation in the context of implementing the method according to the invention.

To this end, the housing 10 is filled with demineralized water, by means of the solenoid valve 54a, the scavenging air previously introduced into the housing being removed by the counting circuit.

The three-way valve 58 is placed into its position bringing the pipe 53 into communication with the sampling pipe 61.

The demineralized water which has come into contact with the rod inside the housing 10 reaches the sampling receptacle 68. The sampling flask 70 is filled by opening the valve 69 and counting is carried out in the laboratory on the sample contained in the flask 70 in order to determine, by comparing with counting carried out on a sample of the pool water, the possible presence of fission products in the sample.

When a certain result has been obtained, the rod is extracted from the cell after opening the cap 5, and the rod is deposited in a storage zone, before its removal to a reprocessing plant, inside a container, or its re-use inside a fuel assembly, depending on the result of the monitoring carried out.

After having extracted the rod from the housing of the cell, following a detection operation, the cap of the cell is reclosed and the internal volume of the cell is decontaminated and washed by a flow of air and then by a flow of water. It is then checked that the cell has returned to its initial state and no longer contains fission product, by direct counting on the scavenging gas traversing the empty cell and by water sampling, the counting of which is carried out in the laboratory.

The counting device 63 which is used for the detection of fission products in the gases flowing inside the cell comprises a β detector combined with the counting channel 65, the electronic module 67 and the recorder 67'.

After detection of a non-sealed rod, a complete cycle, analogous to the cycle implemented for the detection, is carried out on the cell not containing a fuel rod in its housing.

After washing and decontamination, the cell is again ready to provide the detection on a fuel rod.

The extraction and installation of the rods in the detection cell are carried out by means of a handling gripper which engages with the end of the rod which remains projecting in relation to the upper surface of the head 4 of the cell, after removing the cap 5. The length of this end portion, which enters the housing 15 of the cap in the closed position, is of the order of 10 mm; this length may be adjusted, as indicated hereinabove, by choosing an adjustment rod of desired length.

The method and the device according to the invention make it possible to detect a leak from individual fuel elements, such as rods for fuel assemblies, very reliably, rapidly and by operations performed largely automatically.

The counting, carried out on a sample of water taken from the housing of the cell and performed in the laboratory, makes it possible to check, under the best possible conditions, the results of the counting carried out on a gas which has flowed within the housing of the cell.

The method and the device according to the invention make it possible to check the results obtained by a method for detecting defective fuel rods in an assembly using, for example, ultrasonic transducers or eddy current probes. It therefore becomes possible to monitor individually and to check the state of the rods of a fuel assembly, in such a manner as to refurbish the of this assembly very reliably.

The detection cell may have a structure other than that which has been described. The body of the cell may be constructed as a single piece. However, the construction in the form of separate sections permits adjustment as a function of the length of the fuel elements on which the detection is carried out.

The cap of the cell may comprise opening and closing means different from those which have been described. The fluid circuit may also be constructed in a different manner by using any hydraulic or pneumatic component, such as solenoid valves or direction control valves.

The invention is applicable to the detection of a leak from any individual fuel element of an assembly for a water cooled nuclear reactor.

What is claimed is:

1. Device for detecting a leak from a fuel element of an assembly for a nuclear reactor, said device comprising
   (a) a cell comprising a hollow, elongate body delimiting a housing for a fuel element extending along a longitudinal direction of said body and emerging in end parts of said cell, one of said end parts receiving a cap for closing and opening one of ends of said housing;
   (b) means for remote opening and closing of said cap; and
   (c) a fluid circuit comprising at least one source of pressurized demineralized water, a source of compressed air, pipes for connecting said sources to said housing of said cell, means for counting radioactive products and a pump connected to said housing of said cell, means for sampling water in said housing of the cell and components for controlling a flow of said pressurized water and air in said fluid circuit an din said housing of said cell;
   (d) wherein said means for controlling said opening and closing of said cap of said cell comprise an actuator fixed on said body of said cell, said cell having a rod extended by a drive shaft connected to said cap at its end opposite said rod of said actuator movable in said longitudinal direction of said cell, in such a manner as to displace said cap in a longitudinal direction, said shaft carrying at least one roller engaged in a groove of said end part of said cell on which said cap rests in such manner as to perform, successively, displacement of said cap in said longitudinal direction and pivoting of said cap about said axis of said drive shaft.

2. Device according to claim 1, wherein said body of said cell comprises at least two successive sections along a longitudinal direction of the cell, said sections being connected by a demountable connecting device.

3. Device according to claim 1, wherein said drive shaft is connected to said cap in a longitudinal direction by means of a bolt engaged in an opening of said cap and in a tapped opening of said shaft, and in a transverse direction by a pin traversing said shaft and comprising end parts outside said shaft engaged in housings of said cap.

4. Device according to claim 3, comprising a handling lug fixed on said cap to enable opening of said cap, manually and remotely, after unbolting said bolt connecting said cap to said drive shaft.

5. Device according to claim 1, wherein one of said end parts of said cell pierced by a channel, in a longitudinal direction, comprises means for closing and opening the end of said channel emerging on an outside of said cell, in order to insert and to hold in said housing of said cell an adjustment rod, in longitudinal direction, serving as support at one end of said fuel element in order to adjust a position of said fuel element in said housing in a longitudinal direction.

6. Device according to claim 1, wherein said fluid circuit is connected to said housing of said cell, at one of its ends, by means of a three-way valve, said valve comprising a first way which communicates with an end of said housing, a second way which communicates with a pipe for flow of pressurized fluid from said fluid circuit and a third way which emerges, outside said cell, in a pool in which said cell is immersed, said three-way valve being controlled by pressurized fluid.

7. Device according to claim 6, wherein said three-way valve is connected, for its control, to a pipe from said fluid circuit receiving compressed air.

8. Device according to any one of claims 1, 2, 3 or 4, wherein said actuator for controlling opening and closing of said cap is connected by means of pipes to said fluid circuit for its supply of compressed air.

9. Device according to claim 1, wherein said body of said cell comprises a dual casing comprising an internal casing which delimits said housing for receiving said fuel element.

* * * * *